United States Patent
Smith et al.

(10) Patent No.: US 7,965,433 B2
(45) Date of Patent: Jun. 21, 2011

(54) BIAS CONTROLLER

(75) Inventors: Andrew James Smith, Chemlsford (GB); Christopher Ralph Pescod, Chemlsford (GB)

(73) Assignee: BAE Systems PLC, London (GB)

( * ) Notice: Subject to any disclaimer, the term of this patent is extended or adjusted under 35 U.S.C. 154(b) by 239 days.

(21) Appl. No.: 12/161,735

(22) PCT Filed: Jun. 17, 2008

(86) PCT No.: PCT/GB2008/050453
§ 371 (c)(1),
(2), (4) Date: Jul. 22, 2008

(87) PCT Pub. No.: WO2009/001120
PCT Pub. Date: Dec. 31, 2008

(65) Prior Publication Data
US 2010/0245968 A1 Sep. 30, 2010

(30) Foreign Application Priority Data

Jun. 25, 2007 (EP) ..................................... 07270033
Jun. 25, 2007 (GB) ................................... 0712190.8

(51) Int. Cl.
*G02F 1/03* (2006.01)
(52) U.S. Cl. ....................................... 359/259; 359/245
(58) Field of Classification Search .................. 359/245, 359/239, 238
See application file for complete search history.

(56) References Cited

U.S. PATENT DOCUMENTS

| | | | |
|---|---|---|---|
| 5,003,624 A * | 3/1991 | Terbrack et al. | 398/198 |
| 5,946,086 A * | 8/1999 | Bruce | 356/243.8 |
| 6,185,345 B1 | 2/2001 | Singh | |
| 6,334,004 B1 * | 12/2001 | Ohkuma et al. | 385/2 |
| 6,567,217 B1 * | 5/2003 | Kowarz et al. | 359/618 |
| 6,678,431 B2 * | 1/2004 | Han et al. | 385/11 |
| 6,795,596 B2 * | 9/2004 | Bulow | 385/4 |
| 2001/0005437 A1 | 6/2001 | Masuda | |
| 2002/0061034 A1 | 5/2002 | Schneider | |
| 2003/0128906 A1 | 7/2003 | Bulow | |
| 2006/0083144 A1 | 4/2006 | Piede | |

FOREIGN PATENT DOCUMENTS

| | | |
|---|---|---|
| EP | 1 005 182 A1 | 5/2000 |
| EP | 1 168 039 A2 | 1/2002 |
| EP | 1 005 182 B1 | 9/2004 |
| GB | 2 259 621 A | 3/1993 |
| GB | 2 293 022 A | 3/1996 |
| GB | 2 339 278 A | 1/2000 |

(Continued)

OTHER PUBLICATIONS

Search Report issued in related international application GB0712190.8, Sep. 14, 2007, 1 page.

(Continued)

*Primary Examiner* — Timothy J Thompson
(74) *Attorney, Agent, or Firm* — Pillsbury Winthrop Shaw Pittman LLP

(57) ABSTRACT

The present invention relates to a bias controller for a dual output electro-optic modulator and a method for controlling the bias of a dual output electro-optic modulator. The invention further comprises an optical commutator switch with a plurality of dual-output electro-optic modulators interconnected in a tiered arrangement, and control means for deriving measurements of optical power from each of the modulators. The optical commutator is further used for determining respective bias control signals to achieve and maintain operation of the modulators substantially at their quadrature bias points, and further for generating said respective bias control signals for applying them to the respective modulators.

13 Claims, 3 Drawing Sheets

FOREIGN PATENT DOCUMENTS

| | | |
|---|---|---|
| JP | 04-294318 | 1/1992 |
| JP | 4-294318 | 10/1992 |

OTHER PUBLICATIONS

European Search Report issued in related international application EP 07 27 0033, Dec. 5, 2007, 2 pages.

Notification of Transmittal of International Search Report and Written Opinion of the International Search Report issue in PCT/GB2008/050453, Sep. 2, 2008, 18 pages.

A.C. O'Donnell et al., "A 1x16 lithium niobate optical switch matrix with integral TTL compatible drive electronics", Electronics Letters, vol. 27, No. 25, Dec. 5, 1991, pp. 2367-2368.

A.C. O'Donnell et al., "A 1x16 lithium niobate optical switch matrix with integral TTL compatible drive electronics", Integrated Photonics Research, vol. WG1, Apr. 10, 1991, pp. 77-78.

International Preliminary Report on Patentability in related application PCT/GB2008/050453 mailed Jan. 14, 2010, 11 pages.

\* cited by examiner

BIAS CONTROLLER

CROSS REFERENCE TO RELATED APPLICATIONS

This is the U.S. National Phase of PCT/GB2008/050453, filed Jun. 17, 2008, which claims priority to British Application No. 0712190.8, filed Jun. 25, 2007, and European Application No. 07270033.9, filed Jun. 25, 2007, the entire contents of all of which are incorporated herein by reference.

This invention relates to bias control in electro-optic modulators and in particular, but not exclusively, to a bias controller providing dynamic bias control in one or more dual-output electro-optic modulators.

Electro-optic modulators, for example dual-output Mach-Zehnder interferometer electro-optic modulators, are used extensively in optical communication systems, including cable TV transmission systems. There are a number of known approaches to the control of bias in Mach-Zehnder modulators in particular, ranging from one-off bias adjustments to dynamic control of bias. In the analogue domain in particular, a known approach to dynamic bias control of Mach-Zehnder electro-optic modulators involves the application of a pilot tone (for example a 10 kHz tone for a 1 GHz communications signal of interest) to the modulating electrode, monitoring of the output of the modulator and adjusting the bias voltage based upon that output. For example, given that the amplitude of the $2^{nd}$ harmonic of the pilot tone usually tends to zero at or around the quadrature point in operation of a Mach-Zehnder modulator, one previously proposed approach monitors this second harmonic and adjusts the applied DC bias voltage to drive the second harmonic to zero. An equivalent approach has been proposed for the digital domain; the signal applied being typically a square wave dither signal, and the output being monitored using a digital signal processor.

Whilst each of these known approaches do enable a form of dynamic bias control to be provided, they each have attendant disadvantages. For example, the application of a pilot tone necessarily gives rise to modulation products (for example sidebands) that limit the achievable dynamic range of the system, and for high-fidelity optical links this reduction in dynamic range is generally unacceptable. In very high-speed links (for example, digital links with speeds of up to 100 GBit/s and analogue links with frequencies of up to 60 GHz), the application of a dither can adversely affect the achievable data rate and the length of link that is achievable. Another disadvantage arises in particular where multiple channels are required, for example in a phased array antenna system, in that the bias control hardware needs to be fully replicated for each and every modulator. This increases system bulk, complexity and cost.

From a first aspect, the present invention resides in a bias controller for a dual output electro-optic modulator, the modulator having an input for a bias control signal to enable control of the modulator bias point, the bias controller comprising:

means which when coupled to the modulator are arranged to generate power signals indicative of the optical power at each output of the modulator;

control means for processing the power signals and for determining, according to the difference in average indicated optical power between the outputs of the modulator, a bias control signal to be applied to achieve or to maintain a predetermined bias point of the modulator; and means for generating the bias control signal for output to the modulator.

Preferred embodiments of the present invention are arranged to control the bias point for dual output modulators or modulator structures by evaluating the average optical power from the outputs. At quadrature, the average optical output power from the two outputs will be nominally equal. The bias point of a modulator can be controlled by adjusting the voltage at a dc bias electrode (or by applying a dc offset to a modulating electrode). Quadrature bias can thus be achieved by generating a bias control signal of the appropriate voltage and applying it to equalise the power at the two outputs. This approach can be extended to a commutator architecture, for example, by examining both individual outputs and sums of outputs.

According to this first aspect of the present invention, the control means are arranged to determine, in particular, a bias control voltage to be applied to the modulator. In a preferred embodiment, the control means are operable to control the bias point of a modulator by means of an iterative or cyclic adjustment process whereby the bias control voltage is adjusted, as required, from one cycle to the next until a desired bias point is achieved, and to maintain the desired bias point during operation of the modulator.

Preferably, the control means are arranged to determine the time interval between successive adjustments to the bias control voltage. This is advantageous because some types of electro-optic modulator respond relatively slowly to changes in bias control voltage. The control means are arranged to determine the most appropriate size of bias control voltage adjustment and the time interval to the next adjustment for the particular type of modulator being controlled to ensure that sufficient time is allowed for the modulator to respond to each adjustment before the next is applied.

Where an electro-optic modulator, in particular a Mach-Zehnder electro-optic modulator, is required to operate substantially at a quadrature bias point, then the average power of optical signals being output from each of the outputs should remain substantially equal. In a preferred embodiment, the control means are arranged to determine the characteristics of a bias control signal necessary to achieve a substantially equal average optical output power at the outputs as a method for achieving and maintaining operation of the modulator at a quadrature point.

In a preferred embodiment, the control means comprise a digital processor and the power signals comprise digital representations of the optical power at each output of the modulator.

In a further preferred embodiment, the means for generating power signals comprise photodiodes having a frequency response sufficiently low to enable direct detection of the average optical power at a respective output over a period. This has the advantage that the measurement of average optical power in a modulated optical signal is simplified in comparison with an arrangement in which photodiodes able to respond to all the intensity changes due to modulation are used. In the latter case, some means for summing the signal powers indicated by the photodiodes over a period of time would be required. A photodiode having a sufficiently low frequency response in comparison with the frequency of modulation would indicate the average optical power level directly.

The bias controller according to this first aspect of the present invention may be arranged to control the bias of a number of electro-optic modulators, for example in a time-interleaved manner. Preferably, to achieve this, the means for generating the power signals and the means for generating the bias control signals are arranged to operate for each of a plurality of electro-optic modulators and the control means are operable to control the bias point of each of the plurality of modulators.

From a second aspect, the present invention resides in a bias controller for a plurality of dual output electro-optic modulators, each modulator having a bias control input to enable control of the modulator bias point with a respective bias control signal, the bias controller comprising:

means which when coupled to at least one of the plurality of modulators are arranged to generate power signals indicative of the optical power at the outputs of each modulator;

control means for processing the power signals and for determining, according to the difference in average indicated optical power between the outputs of a modulator, the characteristics of a respective bias control signal to be applied to achieve or maintain a predetermined bias point of the modulator; and means for generating the bias control signals, according to the determined characteristics, for output to the respective modulators.

From a third aspect, the present invention resides in a method for controlling the bias of a dual output electro-optic modulator, comprising the steps of:

(i) measuring the optical power of signals at each output of the modulator;
(ii) determining from the measurements of optical power at step (i) the average optical power at each output of the modulator over a period;
(iii) determining, according to the difference in average optical power between the outputs, a bias control signal to be applied to achieve or maintain a predetermined bias point of the modulator; and
(iv) generating the bias control signal determined at step (iii) for output to the modulator.

Preferably, as discussed above, to enable dynamic control of bias, the method according to this third aspect of the present invention comprises the further step of:

(v) repeating steps (i) to (iv) to achieve or maintain a predetermined bias point during operation of the modulator.

Each operation of method steps (i) to (iv), or each successive operation under method step (v), represents one adjustment cycle. Advantageously, to enable adjustments to be suited to the particular type of modulator whose bias is being controlled, step (iii) further comprises determining the size of a bias voltage adjustment to be applied at each successive operation of step (v). In a further refinement, step (iii) further comprises determining the time interval between successive operations of step (v).

In a preferred application of the method according to this third aspect of the present invention, where the predetermined bias point is the quadrature bias point of the modulator, then at step (iii), the determined characteristics of a bias control signal are such as to minimise the difference in average optical power between the two outputs of the modulator. This technique is applicable, in particular, to the Mach-Zehnder type of dual-output electro-optic modulator for which the optical power levels at the outputs are substantially equal when the modulator is operating at its quadrature bias point.

The method according to this third aspect of the present invention may also be applied to the control of bias for a number of electro-optic modulators comprising at least a first, a second and a third dual output modulator, the first modulator having a first optical output coupled to an input of the second modulator and a second optical output coupled to an input of the third modulator, wherein:

step (i) further comprises measuring the optical power at each of the outputs of the second and third modulators and deriving therefrom the output power at each of the first and second outputs of the first modulator by summing the measured optical powers at the outputs of the second modulator and the third modulator respectively;

step (ii) further comprises determining respective average optical powers for the outputs of the first, second and third modulators over a period using the measured and derived powers from step (i);

step (iii) further comprises determining the bias control signals for each of the first, second and third modulators; and step (iv) further comprises generating respective bias control signals for output to the first, second and third modulator.

In some arrangements of electro-optic modulators, it may not be necessary to link to every modulator output to the bias controller in order to determine the optical power being output. For example, where an output of a first modulator is coupled to the input of a second modulator, then if the optical power at each of the outputs of the second modulator is known, summing the optical powers output by the second modulator provides a measure of the optical power output by the respective output of the first modulator, less some fixed loss. This is the case in particular with an arrangement for an optical commutator switch.

From a fourth aspect, the present invention resides in an optical commutator switch comprising a plurality of electro-optic modulators interconnected in a tiered arrangement to provide, from a single optical input, a plurality of time interleaved optical outputs, further comprising a bias controller according to the first or second aspect of the present invention for controlling the bias of each of the plurality of modulators to operate at quadrature.

UK patent number GB 2,259,621 describes an optical commutator switch comprising a hierarchical ranked arrangement of electro-optic switches, each switch having a single input and N outputs, wherein each output of a switch in a rank is connected to the input of a switch in the adjacent higher order rank. Switches in the final, highest order rank—that having the greatest number of switches and providing the outputs of the switch—are driven between states by an oscillator of frequency f, while the switches in each successive lower order rank are driven at a frequency that is double the frequency used in the adjacent higher order rank so that the highest frequency drives the lowest order rank modulator.

An optical commutator switch such as that described in the patent referenced above may be conveniently implemented using Mach-Zehnder electro-optic modulators each having two outputs. However, Mach-Zehnder modulators, in common with similar types of electro-optic modulator, are prone to bias point drift. In an optical commutator switch comprising multiple electro-optic modulators, bias point drift in one or more modulators may render the commutator switch inoperable. Independent adjustment to the bias voltages of a large number of modulators by manual techniques, to the extent required to maintain reliable operation, is generally considered impractical.

From a fifth aspect, the present invention resides in an optical commutator switch, comprising a plurality of dual-output electro-optic modulators interconnected in a tiered arrangement wherein a first tier, having a single modulator arranged to receive an optical input signal, is optically coupled to a final tier having a plurality of modulators arranged to output a plurality of optical signals derived from said optical input signal, and wherein the optical commutator switch further comprises a bias controller having: means for measuring the optical power of signals output by modulators of said final tier; control means for deriving from said measurements of optical power the average optical power of signals output from each of said plurality of modulators and for determining respective bias control signals for achieving and maintaining operation of said plurality of modulators substantially at their quadrature bias points; and means for generating said respective bias control signals and for applying them to the respective modulators.

In a preferred embodiment according to this fifth aspect of the present invention, the commutator switch may be scaled to provide a required number of outputs by introducing one or more intermediate tiers of dual-output electro-optic modulators optically coupled between the first tier and the final tier of modulators. Advantageously, the optical power being output by every modulator in the commutator switch may be derived by the bias controller using only the outputs from the final tier of modulators. However, preferably, in operation, an initial set-up phase may be implemented in which the bias point of the modulator in the first tier is adjusted first of all to ensure that all modulators are receiving light before operation of the switch begins.

An optical commutator switch, in particular one based upon dual-output Mach-Zehnder Interferometer Optical Modulators, in combination with a bias controller according to preferred embodiments of the present invention, may find application in high speed optical sampling systems, or in very high sample rate analogue to digital (A-D) converters for example. In a preferred embodiment of the present invention, an optical commutator switch may be implemented on a single substrate and the bias control techniques according to the present invention may be applied to provide dynamic bias control of all the modulators in such a commutator switch.

There are a number of advantages in the method of bias voltage control as implemented in bias controllers according to preferred embodiments of the present invention over known methods of bias control. A selection of advantages includes:

(1) The presence of a radio frequency (RF) signal on the modulating electrode does not affect the average optical output power of the modulator and hence bias control may in theory be performed at any time during operation of the modulator being controlled.

(2) The bias controller is fully digital in its operation, allowing it to be easily scaled for the control of any number of modulators and allowing for re-use of much of the hardware.

(3) The bias controller is not affected by variations in optical input power to the modulator/commutator as it only examines the ratio of one output of a modulator to the other.

(4) The bias control technique does not interfere with a modulated signal, other than when adjusting the bias point. However, being a digital implementation, bias control adjustments may be scheduled to fit in with the pattern of operation of a host system, e.g. through setting aside a system calibration phase, or by allocating time slots for adjustment during normal operation.

Preferred embodiments of the present invention will now be described in more detail and with reference to the accompanying drawings, of which:

Preferred embodiments of the present invention will be described hereafter with particular reference to a bias controller for one or more Mach-Zehnder (MZ) modulators. Preferably, a number of MZ modulators are used to implement an optical commutator switch and the bias controller is arranged to control the biasing of some or all of the MZ modulators making up the switch. However, other arrangements and applications of MZ or other types of modulators are also anticipated and the bias controller according to preferred embodiments of the present invention is not intended to be limited in application to MZ modulators nor to the control of bias in modulators when applied in the particular arrangements described herein.

A known dual output MZ modulator that may be used as an electro-optic modulator will now be described briefly with reference to FIG. 1.

Figure 1:
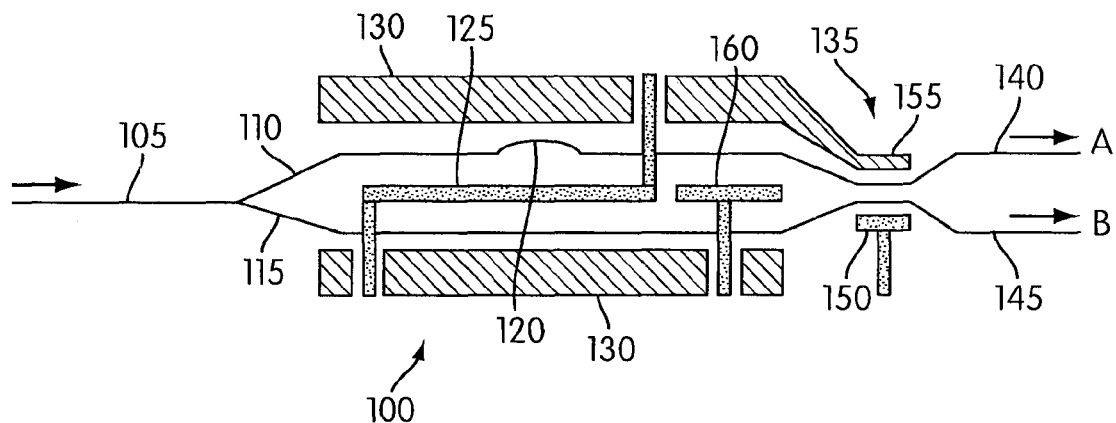
FIG. 1 is a sectional view through a known dual output Mach Zehnder modulator.

Referring to FIG. 1, the MZ modulator 100 comprises a pair of optical waveguides 110, 115, formed in a suitable substrate (not shown in FIG. 1) by splitting an input optical waveguide 105 into two branches 110 and 115. The substrate material, preferably Lithium Niobate ($LiNbO_3$), Gallium Arsenide (GaAs) or Indium Phosphide (InP), exhibits an electro-optic effect, i.e. it changes its optical refractive index when an electric field is applied to it. A small asymmetry 120 is included in one of the branches 110 of the modulator to introduce a phase shift to light travelling down that branch 110 in comparison to light travelling down the other branch 115. The phase shift introduced by the asymmetry 120 is typically set to 90° at the intended wavelength of operation (nominally 1300 or 1550 nm).

The branches 110, 115 are brought together in a directional coupler 135 which generates the dual optical outputs 140, 145. The coupler 135 is a symmetrical structure, formed by placing two waveguides close to each other such that the input power is able to transfer between them. A bias electrode 150 and ground plane 155 are present over the length of the directional coupler 135. These are used to apply a direct current (DC) electric field which has, the effect of adjusting the effective length of the coupler 135 and may be used to adjust the coupling pattern, for example to equalise the amplitude of light signals in the two outputs, to correct for manufacturing variations. In the MZ modulator architecture described here, the phase relationship at the inputs (110, 115) to the coupler 135 determines the behaviour at the coupler outputs 140, 145. In a single output modulator, one output from the coupler is unused.

Figure 2:
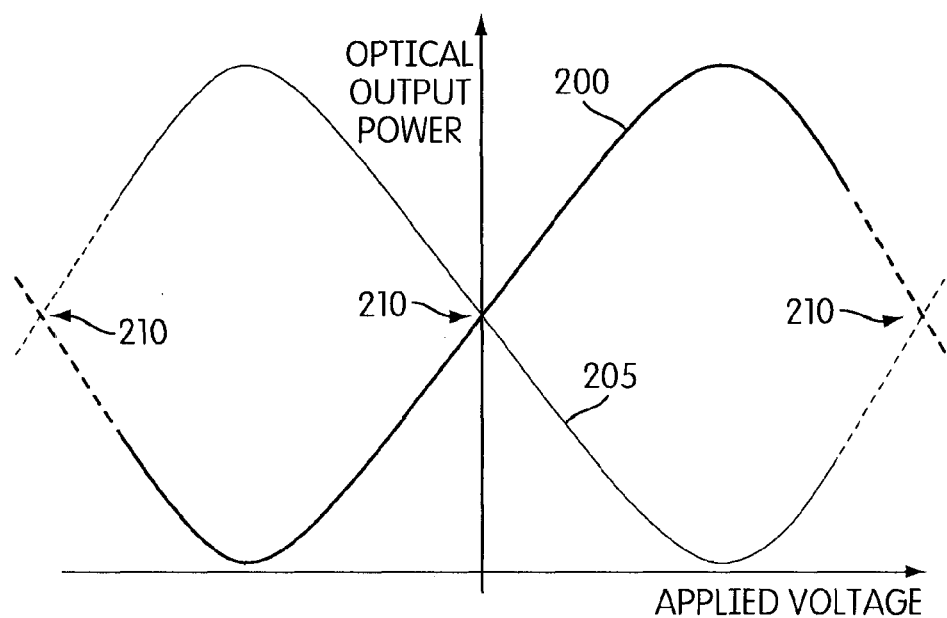
FIG. 2 is a graph showing the optical power transfer characteristic for each output of the Mach-Zehnder modulator shown in FIG. 1.

The MZ modulator 100 is provided with a modulating electrode 125, located between the two waveguide branches 110, 115, and a ground plane 130 in one or more sections. The modulating electrode 125 and the ground plane 130 are positioned so that when a voltage is applied to the modulating electrode 125 an electric field is set up between the modulating electrode 125 and the ground plane 130 through regions of the substrate that contain the waveguide branches 110, 115. Preferably, the MZ modulator structure is designed to allow one branch of the modulator to see a 'positive' electric field (hence increasing its refractive index) whilst the other branch sees a 'negative' electric field (hence reducing its refractive index). The net effect of applying a voltage to the modulating electrode 125 is to change the phase relationship between light signals passing through the different branches 110, 115 at the output coupler 135, and hence to change the optical output levels at the respective optical outputs 140, 145. For a given optical carrier signal input (105) to the MZ modulator 100, the optical output power levels follow a sinusoidal transfer characteristic with increasing or decreasing voltage on the modulating electrode 125, as shown in FIG. 2. The modulating electrode 125 is designed as a transmission line, so that a modulating signal travels with the light through the device. This enables high modulation frequencies to be achieved.

Referring to FIG. 2, two graphs 200 and 205 are provided to show the optical output power transfer characteristics at each of the optical outputs 140 and 145 respectively as the voltage applied to the modulating electrode 125 is varied. As can be seen, the optical output power varies sinusoidally as the applied voltage is varied, with a 180° phase difference between the graphs 200, 205. When the applied voltage is such that the optical output power is at the central point of its transfer characteristic, i.e. at points 210 in the graphs 200, 205 of FIG. 2, the modulator is said to be at a quadrature point, or simply "operating at quadrature", and the optical output power levels in the outputs 140, 145 are substantially equal. These are the most linear regions of the transfer characteristic. These are also the points at which there is a 90° phase relationship between light travelling through respective branches of the waveguide.

As can be seen in FIG. 2, the transfer function 200, 205 is a repeating function and as such there are many quadrature points 210 at different bias voltages but all with the same power output. A quadrature point, in the region of which the output power is increasing, in a particular output, with increasing bias voltage is referred to as a "positive slope quadrature bias point" for that output. Where the output power is decreasing in that output with increasing bias voltage, the respective quadrature points are referred to as "negative slope quadrature bias points" for that output.

In practice, the 90° phase shift in the modulator branches is rarely (if ever) achieved, so a dc bias voltage needs to be applied to the modulator to correct this. A bias electrode 160 may be provided for this purpose. Due to various processes including varying temperature and trapped charge, the bias point will drift at a rate of between a few mV per hour to several volts per hour, depending on the modulator construction. Hence, a 'set-and-forget' fixed bias voltage solution is rarely adequate. This is especially true in an arrangement of MZ modulators forming a high speed commutator switch in which significant drift from the quadrature point by any one MZ modulator may render the entire switch inoperable.

According to a first embodiment of the present invention, an apparatus and method are provided for monitoring and controlling the bias point of a dual output MZ modulator. In this embodiment in particular, the bias point for a dual output MZ modulator is determined by monitoring the optical output power at each of the optical outputs and determining the average output power from each output over a period of time. If the MZ modulator is at quadrature, then the average optical output power from the two outputs will be nominally equal. Quadrature bias is then achieved and maintained by adjusting a bias voltage that is applied to the bias electrode 160, or alternatively to the modulating electrode 125 as a DC-offset, in order to equalise the optical power at two outputs. An apparatus for implementing this general method of bias control will now be described with reference to FIG. 3.

Figure 3:
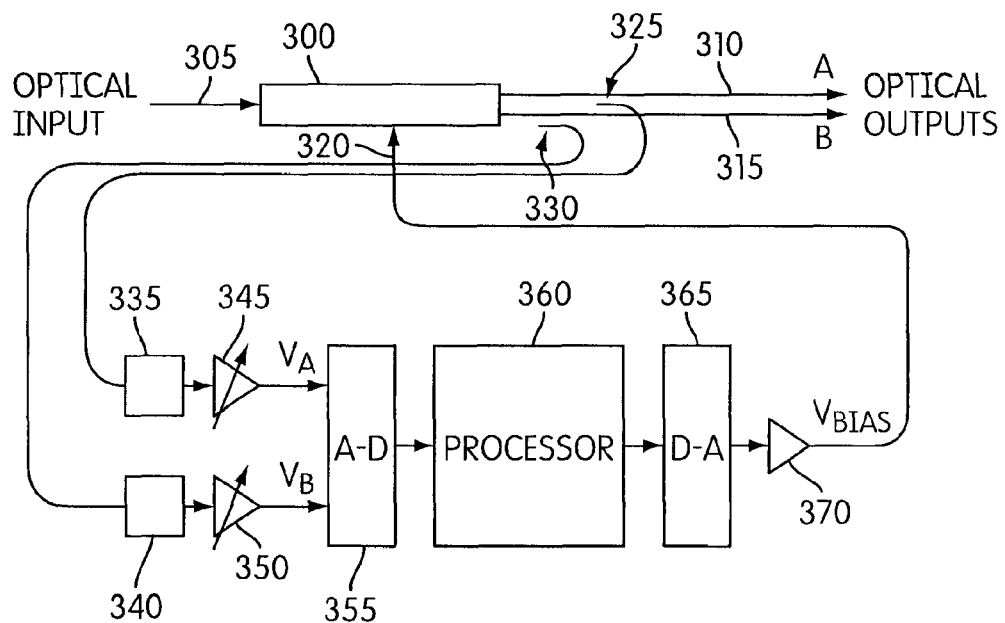
FIG. 3 is a diagram showing a bias controller according to preferred embodiments of the present invention, applied to controlling the bias voltage of a dual output Mach-Zehnder modulator shown in FIG. 1.

Referring to FIG. 3, the apparatus comprises an MZ modulator 300 having an optical input 305 for receiving an optical carrier signal and a pair of optical outputs 310, 315 labelled A and B respectively. The MZ modulator 300 is also provided with an bias voltage input 320 for receiving a bias voltage signal.

To enable the optical output power from the modulator 300 to be monitored, optical tap couplers 325 and 330 are provided in the optical outputs 310 and 315 respectively to tap up to 5% of the power of output optical signals. The tapped optical signals are fed to respective photodiodes 335 and 340, chosen preferably to have a low frequency response. Use of photodiodes 335, 340 with a low frequency response is advantageous in that the photodiodes 335, 340 are therefore insensitive to the rapid on-off switching of modulated output light signals and may be used directly to measure average optical power levels at the outputs 310, 315. If photodiodes 335, 340 with a high frequency response were to be used, then a more complex arrangement would be required to measure the average optical output power based upon an integrating detector able to sum the fluctuating optical power levels over a period of time.

The electrical signals output by the photodiodes 335 and 340 are amplified in respective amplifiers 345 and 350 having adjustable gains and the output voltages, $V_A$ and $V_B$ respectively, indicative of the optical output power on the respective optical outputs 310, 315, are digitised in an analogue to digital converter 355 for input to a processor 360. The use of adjustable gains in the amplifiers 345, 350 allows differential errors in the system, for example between the optical taps 325, 330, between photodiodes 335, 340 or due to a non-ideal modulator 300, to be compensated for.

The processor 360, which may be of any convenient type such as a digital signal processor (DSP), microcontroller, field-programmable gate array (FPGA) or a personal computer (PC), is arranged to implement an algorithm, to be described below, to determine what level of bias voltage needs to be applied to the bias voltage input 320 based upon the received indications of optical output signal power. The processor 360 is arranged to output, in digital form, an appropriate bias voltage signal. The digital bias voltage signal is converted to an analogue bias voltage in a digital to analogue converter 365 and, after amplification (370) the resultant bias voltage $V_{BIAS}$ is input to the MZ modulator 300 at the bias voltage input 320. The bias voltage input 320 may be a connection to a bias electrode 160 in the example of the MZ modulator 100 described above with reference to FIG. 1. Alternatively, the bias voltage input 320 may be coupled to a modulating electrode (125 in FIG. 1) by means of a so-called bias-Tee. In such an arrangement, a DC bias voltage is coupled to the modulating electrode 125 by means of an inductor, and an applied modulating signal (for example an RF communications signal) is coupled to the electrode 125 via a capacitor.

A preferred algorithm for generating the bias voltages to be applied to the MZ modulator 300 according to this first embodiment of the present invention will now be described with reference to FIG. 4. As presented in FIG. 4, this algorithm is designed for adjustment of bias voltage for a positive slope quadrature point. In summary, the algorithm enables the processor 360 to evaluate the relative levels of measured optical power, represented by $V_A$ and $V_B$, in the outputs 310, 315 and if necessary to adjust the bias voltage $V_{BIAS}$ with the aim of keeping the average level of the two digitised voltage inputs ($V_A$ and $V_B$) substantially equal. Preferably, the algorithm operates continuously while the MZ modulator 300 is in operation. However, the algorithm may also be arranged to operate intermittently in respect of the MZ modulator 300, for example at predefined intervals, particularly where more than one MZ modulator is to be controlled in a time-interleaved manner by the processor 360.

Figure 4:
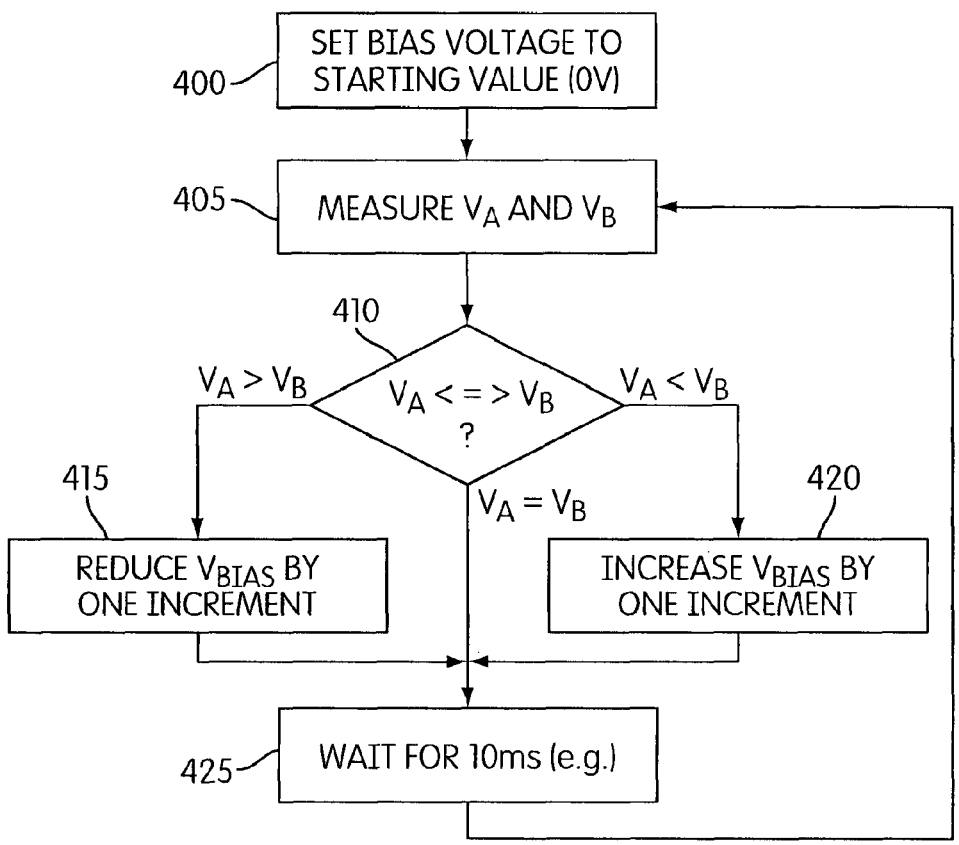
FIG. 4 is a flow diagram showing preferred steps in operation of the bias controller shown in FIG. 3.

Referring to FIG. 4, a flow diagram is provided to show the steps in operation of the preferred algorithm. Beginning at STEP 400, a starting value for the bias voltage is set to zero volts (0V). At STEP 405, the digital representations of the voltages $V_A$ and $V_B$ are read and at STEP 410 they are compared. If $V_A$ is greater than $V_B$, then at STEP 415 the processor 360 is arranged to reduce the bias voltage $V_{BIAS}$ by a predetermined decrement. If $V_A$ is less than $V_B$, then at STEP 420 the processor 360 is arranged to increase the bias voltage $V_{BIAS}$ by the predetermined increment. If $V_A$ is substantially equal to $V_B$, then no adjustment is made to the bias voltage $V_{BIAS}$. When adjusting for a negative slope quadrature point, the tests at STEP 410 are reversed so that the actions at STEP 415 and 420 are performed in the event of $V_A$ being less than $V_B$ and $V_A$ being greater than $V_B$ respectively.

After making any required adjustments to the bias voltage $V_{BIAS}$, at STEP 425, the processor 360 is arranged to wait for a predetermined time period, for example 10 ms, before returning to STEP 405 and beginning a new adjustment cycle. The algorithm must wait between adjustments because the response of the modulator 300 to bias voltage changes is not instantaneous, in particular with LiNbO$_3$ modulators. Preferably, the length of the waiting period is set in combination with the magnitude of the predetermined increment or decrement in the bias voltage in STEP 415 and STEP 420. Preferably, a waiting period of between 10 ms and 1 s is required, depending on the magnitude of the predetermined increment or decrement. In practice, if the processor 360 determines that a large adjustment is required to the bias voltage $V_{BIAS}$, then the algorithm of FIG. 4 ensures that, through an appropriate choice of voltage increment or decrement and waiting period, that the adjustment is made at a rate that can be achieved by the particular modulator 300.

As mentioned above, the photodiodes 335, 340 are preferably of low frequency response, enabling the amplified voltage levels $V_A$ and $V_B$ to be used directly by the processor 360 as representative of the average optical power in the outputs 310, 315. In an alternative arrangement, the processor may be arranged at STEP 405 to monitor the voltage levels $V_A$ and $V_B$ as generated by high frequency response photodiodes 335, 340 over a predetermined period of time within an adjustment cycle to determine the average optical power in each of the outputs 310, 315 for that cycle. Of course other techniques are available for integrating voltage measurements $V_A$ and $V_B$ to provide average optical output power measurements, for example using the voltages $V_A$ and $V_B$ to charge respective capacitors for a period of time within each adjustment cycle so that the processor 360 may measure the voltages across each of the capacitors after that period of time at STEP 405 to determine the average optical powers for each output 310, 315.

Whereas a dual output MZ modulator such as that described above with reference to FIG. 1 is often used in analogue signal distribution systems (e.g. Cable TV (CATV)), another application is in switching. With the modulator biased at quadrature, if an RF signal of appropriate power is applied to the modulating electrode 125, an optical input (105) will switch alternately between the optical outputs 140, 145. The ability of an MZ modulator to operate as a switch may be exploited to make a high-speed optical commutator switch, as described for example in UK patent number GB 2,259,621, by cascading MZ modulators in a hierarchical arrangement of two or more ranks. Each rank of modulators may be driven through their modulating electrodes with an appropriate sinusoidal RF signal to give a required output sequence from the switch.

According to a second embodiment of the present invention, a bias controller is provided for controlling the bias voltages for a number of electro-optic modulators. In particular, a bias controller will now be described with reference to FIG. 5, applied to the control of bias voltages for an optical commutator switch of the type referenced above, comprising seven dual output MZ modulators. However, any multiple modulator arrangement may have bias control provided conveniently by a bias controller according to this second embodiment of the present invention, whether or not there is any coupling of light between the different modulators. Bias control for any one modulator may be provided independently of that for any other in the arrangement.

Figure 5:
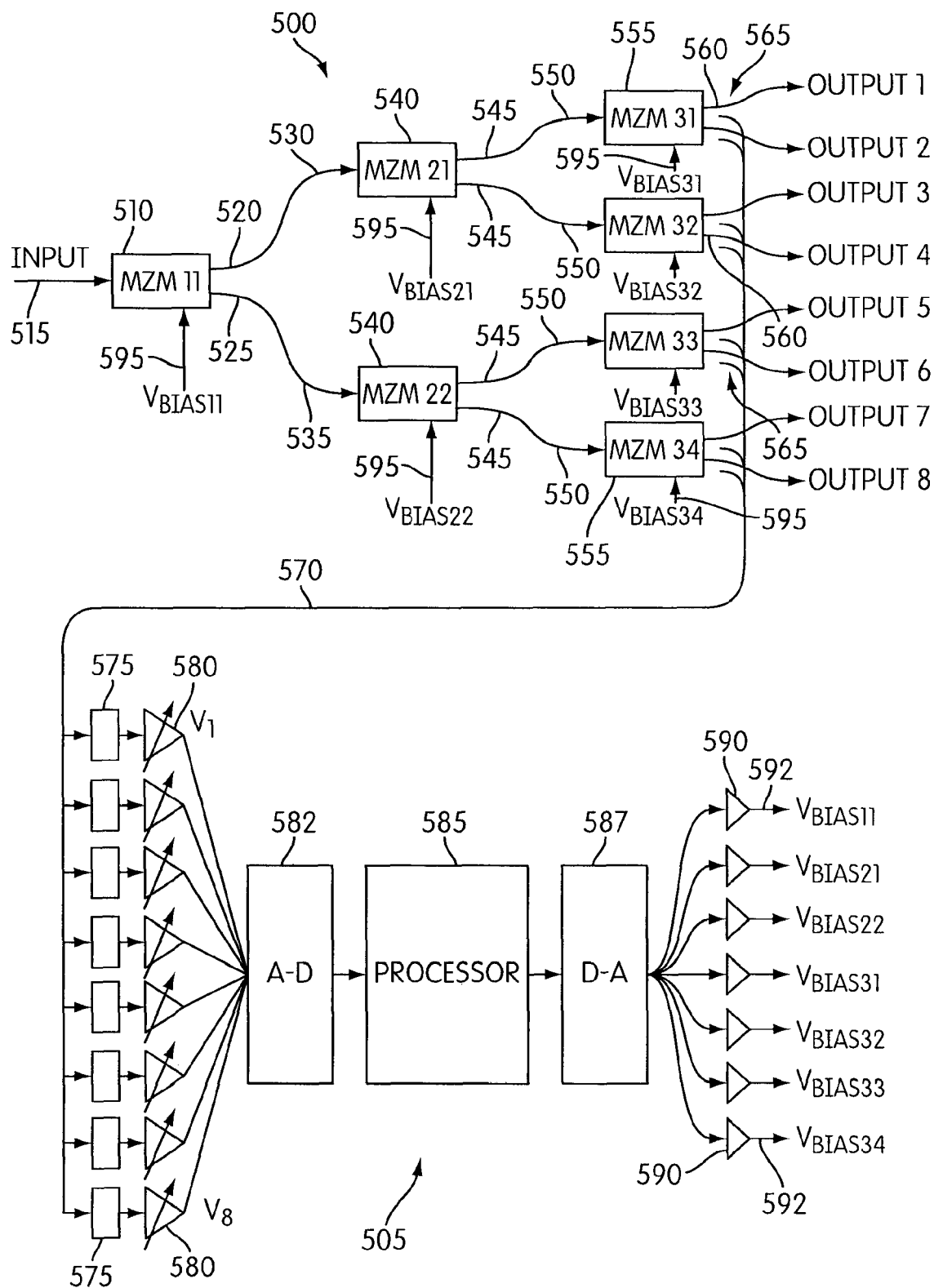
FIG. 5 is a diagram showing a bias controller according to a preferred embodiment of the present invention applied to controlling the bias voltages in a number of Mach-Zehnder modulators arranged as an optical commutator switch.

Referring to FIG. 5, the optical commutator switch 500 is shown in combination with a bias controller 505 according to this second embodiment of the present invention. The commutator switch 500 comprises a hierarchical arrangement of dual output MZ modulators, in this example arranged in three ranks. In the first rank, a single MZ modulator 510, designated "MZM11", receives an optical carrier signal at an optical input 515. Each of the outputs 520, 525 is linked to the optical input 530, 535 of a different respective one of two MZ modulators 540 (MZM21 and MZM22) in the second rank. Each of the outputs 545 of the modulators 540 in the second rank link to optical inputs 550 of different respective ones of four MZ modulators 555 (MZM31, MZM32, MZM33, MZM34) in the third rank. The outputs 560 of the MZ modulators 555 in the third rank are the optical outputs of the commutator switch 500. When the MZ modulators 510, 540, 555 are driven through their modulating electrodes (not shown in FIG. 5) by appropriately phased radio frequency (RF) signals, the outputs of the modulators 510, 540, 555 may be switched between on and off states in a predetermined sequence such that a time interleaved set of optical signals emerge from the outputs 560 of the switch 500.

For the switch 500 to operate correctly, it is important that each of the MZ modulators is accurately biased to operate at or close to its quadrature point. It is also important that the modulators are biased to operate in the region of the correct quadrature point (positive or negative slope, as required, with respect to a given output) in the transfer characteristic (see FIG. 2), as biasing on the wrong slope will result in "upside-down" switching.

However, as discussed above, bias point drift arises for a number of reasons and some form of dynamic bias control is required. To this end, the bias controller 505 captures, via an optical tap coupler 565 provided in each of the eight outputs 560 from the third-rank MZ modulators 555, approximately 5% of the power of optical signals from each of those outputs 560. The captured signals are passed over separate optical fibres 570 (only one is shown in FIG. 5) to respective photodiodes 575. The analogue signals output by each photodiode 575 are amplified in amplifiers 580 with adjustable gain and the output voltages—$V_1$ to $V_8$, representative of the optical output power in the respective outputs 560 of the MZ modulators 555—are input to an analogue to digital converter 582 for conversion into digital voltage signals. A processor 585 receives the digital voltage signals and processes them according to an algorithm to be described below to determine the appropriate bias voltages $V_{BIAS11}$, $V_{BIAS21}$, $V_{BIAS22}$, ..., $V_{BIAS34}$ to generate in order to maintain operation at the quadrature point of each of the respective MZ modulators 510, 540, 555 in the switch 500. The determined bias voltage signals are output in digital form to a digital to analogue converter 587 and the bias voltages $V_{BIAS11}$ to $V_{BIAS34}$ for the modulators "MZM11" to "MZM34" respectively are output individually (592), after amplification (590), and passed to the bias voltage inputs 595 of the respective modulators.

A preferred algorithm for implementation by the processor 585 is based upon the algorithm described above with reference to FIG. 4. It is founded on the realisation that not all the outputs of the individual MZ modulators in the commutator switch 500 need to be monitored in order to determine the correct bias voltages to apply. Only the outputs 560 from the modulators 555 in the third-rank need to be monitored and from these outputs 560 the bias voltages required for all the other modulators 510, 540 can be derived. This is a particular advantage with the hierarchical arrangement of modulators in the optical commutator switch 500. In other arrangements of multiple modulators, the outputs of each modulator may need to be separately monitored in order to derive the correct bias control voltages to apply.

Considering, firstly, the modulators 555 of the third rank of the commutator switch 500, the algorithm of FIG. 4 may be applied without modification to determine the bias voltages required for each modulator 555 separately using the captured optical signals from the respective tap couplers 565.

To determine the bias voltage required for one of the modulators 540 in the second rank, $V_{BIAS21}$ for the modulator "MZM21" for example, the optical output power in each of the outputs 545 from that modulator may be derived from the sum of the output powers in the respective third rank modulator 555 that the output feeds, less some fixed loss. This sum is represented by the sum of the voltages output from the respective amplifiers 580. In practice the "fixed loss" is assumed to be the same for all modulators in the switch 500 and the preferred algorithm for bias voltage adjustment, as described above with reference to FIG. 4, enables the fixed loss to be ignored in preferred embodiments of the present invention. Thus the output power of the upper output 545 in FIG. 5 from the modulator "MZM21" is determined from the sum of the output powers from the outputs 560 of modulator "MZM31", represented by $V_1+V_2$. Similarly, the output power in the lower of the outputs from modulator "MZM21" is determined from the sum of the output powers from the outputs 560 of modulator "MZM32", represented by $V_3+V_4$. Advantageously, neither of the third rank modulators "MZM31" nor "MZM32" need to be correctly biased in order to derive the output powers of the second rank modulator "MZM21". The algorithm of FIG. 4 may therefore be operated, using respective sums of voltages representing the output optical power from the outputs 560 of respective third-rank modulators 555, to determine the bias voltages $V_{BIAS21}$ and $V_{BIAS22}$ to apply to the second-rank modulators 540.

To determine the bias voltage $V_{BIAS11}$ required for the first rank modulator 510, designated "MZM11" in FIG. 5, a similar process may be applied in which the output optical power in each of the outputs 520, 525 from the modulator "MZM11" is equal to the sum of the optical powers in the four outputs 560 of the two third rank modulators 555 that each output 520, 525 eventually feeds. In particular, the optical power at the output 520 of the modulator 510 is determined from the sum of the output powers for the two modulators "MZM31" and "MZM32", represented by $V_1+V_2+V_3+V_4$. The optical power for the output 525 of the modulator 510 is determined from the sum of the output powers for the two modulators "MZM33" and "MZM34", represented by $V_5+V_6+V_7+V_8$. The algorithm of FIG. 4 may therefore be applied to determine the bias voltage $V_{BIAS11}$ required for the first-rank modulator 510 using the corresponding sums of voltages from the captured output optical signals (565).

Preferably, in practice, the algorithm must carry out an initial setup phase comprising setting the bias voltage for the first modulator 510 ("MZM11") in the structure and then setting the bias voltages for the modulators from lowest to highest rank. If the algorithm were to attempt to set the bias voltages for the highest-ranked modulators 555 initially, there is a risk that some of those modulators 555 may not initially be receiving any light (if, for example, "MZM11" was putting all its optical power out of one output), making setting up impossible.

Once the initial setup phase has been completed (i.e. all modulators are seeing light), adjustments can either be made in any conceivable combination, for example one modulator at a time, all at the same time or one rank at a time. This may be achieved in theory because the information from a single captured set of output power levels provides all the information required to determine the bias states of every modulator in the commutator switch 500. However, in practice, adjustment of for example one rank of modulators at a time helps to avoid slow oscillations in bias state through the switch caused by the generally slow response by modulators to bias voltage changes.

Adjustment to bias voltages may be performed (1) continuously, (2) periodically under the control of the processor 585, (3) periodically at the request of the processor 585, or (4) periodically at the request of a host system. In addition to running the bias control algorithm, the processor 585 may also interface with other equipment (the 'host system') to indicate the bias condition of the switch 500, supply diagnostic information, and stop/start adjustment.

The invention claimed is:

1. An optical commutator switch, comprising
    a plurality of dual-output electro-optic modulators interconnected in a tiered arrangement wherein a first tier, having a single modulator arranged to receive an optical input signal, is optically coupled to a final tier having at least two final tier modulators arranged to output a plurality of optical signals derived from said optical input signal, and wherein the optical commutator switch further comprises
    a bias controller having:
        at least one optical signal power detector for measuring the optical power of signals output by said at least two final tier modulators;
        a controller for deriving, from only said measurements of optical power of signals output by said at least two final tier modulators, the average optical power of signals output from each of said plurality of modulators and for determining respective bias control signals for achieving and maintaining operation of said plurality of modulators substantially at their quadrature bias points; and
        a bias control signal generator for generating said respective bias control signals and for applying them to the respective modulators.

2. The optical commutator switch according to claim 1, wherein said controller comprises a digital processor and said signals output at each of the plurality of the modulators comprise digital representations of the optical power.

3. The optical commutator switch according to claim 1, wherein said at least one optical signal power detector comprises photodiodes having a frequency response sufficiently low in comparison with the frequency of any modulation signals applied to the final tier modulators to enable direct detection of the average optical power at a respective output over a period.

4. The optical commutator switch according to claim 1, wherein said controller is arranged to determine a plurality of bias voltages, each bias voltage to be applied to each of the plurality of modulators.

5. The optical commutator switch according to claim 4, wherein said controller is arranged to adjust the bias point of each of the plurality of modulators by an iterative process comprising a plurality of adjustment cycles.

6. The optical commutator switch according to claim 5, wherein said controller is arranged to determine the size of an adjustment to each of the bias voltages for a given adjustment cycle.

7. The optical commutator switch according to claim 6, wherein said controller is arranged to determine the time interval between successive adjustments to each of said bias voltages.

8. The optical commutator switch according to claim 5, wherein said controller is arranged to determine adjustments to be made to the bias control signal of each of the plurality of modulators so that each of the plurality of modulators is operating at its quadrature point and, for each of the plurality of modulators, corresponding signals at the outputs are of substantially equal average optical power.

9. A method for controlling the bias of a dual output electro-optic modulator, comprising the acts of:
  (i) measuring the optical power of signals at each output of the modulator;
  (ii) determining from the measurements of optical power at act (i) the average optical power at each output of the modulator over a period;
  (iii) determining, according to the difference in average optical power between the outputs, a bias control signal to be applied to achieve or maintain a predetermined bias point of the modulator; and
  (iv) generating the bias control signal determined at act (iii) for output to the modulator,
the method being further arranged to control the bias of each of a plurality of electro-optic modulators comprising at least a first, a second and a third dual output modulator, the first modulator having a first optical output coupled to an input of the second modulator and a second optical output coupled to an input of the third modulator, wherein: act (i) further comprises measuring the optical power at each of the outputs of the second and third modulators and deriving therefrom the output power at each of the first and second outputs of the first modulator by summing the measured optical powers at the outputs of the second modulator and the third modulator respectively; act (ii) further comprises determining respective average optical powers for the outputs of the first, second and third modulators over a period using the measured and derived powers from act (i); act (iii) further comprises determining said bias control signals for each of said first, second and third modulators; and act (iv) further comprises generating respective said bias control signals for output to the first, second and third modulator.

10. The method according to claim 9, further comprising the act of: (v) repeating acts (i) to (iv) to achieve or maintain a predetermined bias point during operation of each of said first, second and third modulators.

11. The method according to claim 9, wherein said predetermined bias point is the quadrature bias point of each of said first, second and third modulators and wherein, at act (iii), the bias control signal is determined so as to minimise or to reduce the difference in average optical power between the two outputs of each of said first, second and third modulators.

12. The method according to claim 10, wherein act (iii) further comprises determining the size of a bias voltage adjustment to be applied at each successive operation of act (v).

13. The method according to claim 10, wherein act (iii) further comprises determining the time interval between successive operations of act (v).

* * * * *